United States Patent
Faaborg

(10) Patent No.: US 10,436,597 B1
(45) Date of Patent: Oct. 8, 2019

(54) SYSTEMS AND METHODS FOR SUGGESTING MODE OF TRANSPORT IN A GEOGRAPHIC APPLICATION

(71) Applicant: GOOGLE LLC, Mountain View, CA (US)

(72) Inventor: Alex Faaborg, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/827,503

(22) Filed: Aug. 17, 2015

Related U.S. Application Data

(60) Provisional application No. 62/038,731, filed on Aug. 18, 2014.

(51) Int. Cl.
G01C 21/36 (2006.01)
G01S 19/13 (2010.01)

(52) U.S. Cl.
CPC .......... *G01C 21/3605* (2013.01); *G01S 19/13* (2013.01)

(58) Field of Classification Search
CPC ............ G01C 21/3605; G01C 21/3423; G01C 21/343; G01S 19/13
See application file for complete search history.

(56) References Cited

U.S. PATENT DOCUMENTS

| | | | |
|---|---|---|---|
| 6,421,606 B1 * | 7/2002 | Asai .................. | G01C 21/3423 701/410 |
| 6,968,333 B2 | 11/2005 | Abbott et al. | |
| 8,229,473 B1 * | 7/2012 | De La Rue ............. | H04W 4/20 340/539.13 |
| 8,725,842 B1 | 5/2014 | Al-Nasser | |
| 8,731,814 B2 | 5/2014 | Schunder | |
| 8,787,006 B2 | 7/2014 | Golko et al. | |
| 2003/0109266 A1 * | 6/2003 | Rafiah ................ | G01C 21/3423 455/456.1 |
| 2006/0184314 A1 * | 8/2006 | Couckuyt .......... | G01C 21/3423 701/533 |
| 2008/0059061 A1 * | 3/2008 | Lee .................... | G01C 21/3423 701/412 |

(Continued)

FOREIGN PATENT DOCUMENTS

WO WO-2014/088253 A1 6/2014

OTHER PUBLICATIONS

Augmented SmartWatch Pro, "Release Notes for Augmented SmartWatch Pro—For the Pebble, Sony, MotoACTV & MetaWatch Smart Watches," (2012). Retrieved from the Internet at URL:https://augmentedtraffic.wordpress.com/2012/07/28/introducing-version-2-0-of-augmented-smartwatch-for-sony-with-support-for-the-metawatch-and-the-upcoming-pebble-watch/.

(Continued)

*Primary Examiner* — Stephen Holwerda
(74) *Attorney, Agent, or Firm* — Marshall, Gerstein & Borun LLP

(57) ABSTRACT

A request for directions for traveling to a destination is received via a user interface of a user device, where a mode of transport is not selected via the user interface. A current geographic context of the user device is determined, and suggested mode of transport for travelling to the destination is determined based on the current geographic context. Directions for travelling to the destination using the suggested mode of transport are obtained and provided via the user interface of the user device.

19 Claims, 6 Drawing Sheets

(56) References Cited

U.S. PATENT DOCUMENTS

| | | | |
|---|---|---|---|
| 2009/0216704 A1* | 8/2009 | Zheng | G01C 21/20 |
| | | | 706/52 |
| 2010/0017118 A1* | 1/2010 | Dougherty | G01C 21/3423 |
| | | | 701/533 |
| 2011/0106423 A1 | 5/2011 | Morley | |
| 2012/0004841 A1* | 1/2012 | Schunder | G01C 21/3423 |
| | | | 701/412 |
| 2012/0095979 A1 | 4/2012 | Aftab et al. | |
| 2014/0164943 A1 | 6/2014 | Jeon et al. | |

OTHER PUBLICATIONS

Droid Life, "New Google Now Allows You to Specify Mode of Transportation for Commutes or Other Trips," (2013). Retrieved from the Internet at :<URL: http://www.droid-life.com/2013/02/13/new-google-now-allows-you-to-specify-mode-of-transportation-for-commutes-or-other-trips/>.

Google, "Maps for Mobile Help," (2015). Retrieved from the Internet at URL:https://support.google.com/gmm/answer/2839865?hl=en.

Readwrite, "When the SmartWatch Meets the 'Smart' Car," (2014). Retrieved from the Internet at URL:http://readwrite.com/#!/2014/06/19/mercedes-cla-pebble-smartwatch-drivestyle-integration.

Wired, "Nissan's Nismo Smartwatch Connects Drivers to Cars, Sports Bangle Design," (2013). Retrieved from the Internet at URL:http://www.wired.co.uk/news/archive/2013-09/09/nissan-nismo-smartwatch.

Wired, "SmartWatch Vibrates to Stop You Sleeping on the Job," (2014). Retrieved from the Internet at URL:http://www.wired.co.uk/news/archive/2014-07/08/spark-watch.

* cited by examiner

SYSTEMS AND METHODS FOR SUGGESTING MODE OF TRANSPORT IN A GEOGRAPHIC APPLICATION

FIELD OF TECHNOLOGY

This disclosure relates to interactive geographic applications and, more particularly, to providing navigation directions for driving, bicycling, walking, etc. in client devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Certain geographic software applications provide directions for traveling between a starting point and a destination. For example, a user can submit a request for driving directions from San Francisco to Los Angeles via a geographic application running on her smartphone, and an online mapping service can provide step-by-step driving directions for display by the geographic application. In addition to driving directions, some geographic software applications also can generate directions for different modes of transport, such as bicycling, walking, or riding public transport.

SUMMARY

A geographic application, which can run on a user device as a standalone application or as part of an online geographic service, automatically determines a mode of transport the user is likely to select when requesting directions to a certain destination. The geographic application can suggest the mode of transport in view of such factors as the distance between the current location of the user device and the destination, proximity to public transport, proximity of car rental facilities, current type of movement of the user device, etc. Further, in some cases the user can operate certain controls and/or install certain software to allow the geographic application to determine, based on the user's electronic messages, whether the user rented a car or otherwise expressed a preference for a certain type of transport. The geographic application can provide the directions to the user according to the suggested mode of transport without receiving a selection of the mode of transport via the user interface. The user can override the suggestion and select a different mode of transport. Further, as the user device travels toward the destination, the geographic application can detect a change in the mode of transport and automatically provide directions for the rest of the route according to the changed mode of transport.

One example embodiment of these techniques is a method for providing directions in a geographic application. The method can be executed on one or more processors. The method includes receiving a request for directions for traveling to a destination, including not receiving a selection of a mode of transport. The method further includes determining a current geographic context of the user device, determining a suggested mode of transport for travelling to the destination based on the current geographic context, obtaining directions for travelling to the destination using the suggested mode of transport, and providing the directions via the user interface of the user device.

Another example embodiment of these techniques is a computing device including one or more processors, a user interface coupled to the one or more processors, and a non-transitory computer-readable memory storing instructions. When executed on the one or more processors, the instructions cause the computing device to (i) receive, via the user interface, a request for directions for traveling to a destination, without receiving a selection of a mode of transport, (ii) determine a current geographic context of the user device, (iii) determine a suggested mode of transport for travelling to the destination, based on the current geographic context, (iv) obtain directions for travelling to the destination using the suggested mode of transport, and (v) provide the directions via the user interface of the user device.

Still another example embodiment of these techniques is a method for providing navigation directions to a user. The method can be executed on one or more processors. The method includes receiving, via a user interface of a user device, a request for directions for traveling to a destination, determining an initial mode of transport for travelling to the destination, obtaining directions for travelling to the destination in accordance with the initial mode of transport, providing the directions via the user interface as the user device travels toward the destination using the initial mode of transport, before the user device reaches the destination, automatically detecting that the user device is now traveling using a new mode of transport different from the initial mode of transport, obtaining updated directions for travelling to the destination in accordance with the new mode of transport, and providing the updated directions via the user interface.

DETAILED DESCRIPTION OF THE DRAWINGS

Overview

When a user requests navigation directions to a destination, a geographic application automatically determines the likely mode of transport based on the current geographic context and provides the directions, at least initially, according to the likely mode of transport. Examples of signals the geographic application can consider to determine the current geographic context include availability of public transport near the current location of the user, availability of public transport near the destination to which the user wishes to travel, current use of a car by the user, proximity to the geo-fence (a virtual perimeter) of a car rental facility, the speed and pattern of the user's recent movement, the user's electronic mail messages that may indicate the intention to rent a car, etc.

In an example scenario, the user arrives at the Ronald Reagan National Airport in Arlington, Va., and rents a car at the airport. Before the user starts driving, he invokes the function in the geographic application for requesting directions and selects the United States Patent and Trademark Office as the destination. The geographic application determines that, even though the destination is accessible via public transport, the user is currently within the geo-fence of a car rental facility. The geographic application accordingly suggests driving directions, without the user specifying the mode of transport.

If the user begins driving, parks the car, and continues to walk, the geographic application can detect the change in the pattern of user motion, determines that the remaining distance in general can be covered on foot, and automatically begin outputting further directions according to the walking mode.

Further, some of the functionality the geographic application uses to determine the likely mode of transport may be encapsulated in one or several application programming interface (API) functions in order to provide, to a calling software application, an indication of whether the user has access to car.

Example User Device and Communication System

Figure 1:
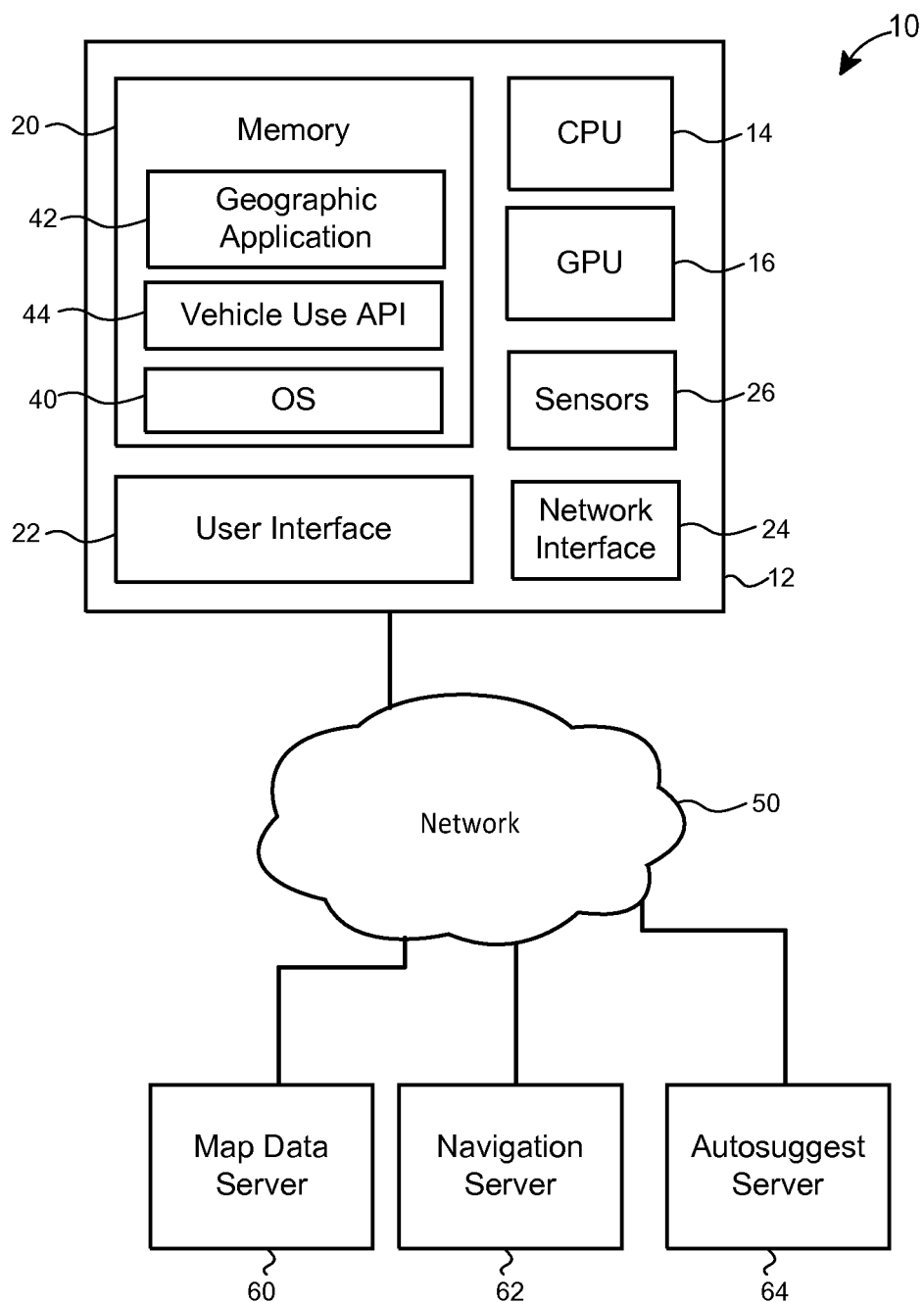
FIG. 1 is a block diagram of an example system in which a geographic application can provide directions according to an automatically determined mode of transport.

An example system 10 in which these techniques can be implemented in illustrated in FIG. 1. The system includes a user device 12, which can be a portable device such as a smartphone or a tablet computer, a non-portable device such as a desktop computer, or a special-purpose computing device such as a navigator, for example. The user device 12 can include one or more processors, such as one or several central processing units (CPUs) 14 and a graphics processing unit (GPU) 16, a computer-readable memory 20 which can include persistent (e.g., flash disk) and/or non-persistent (e.g., random access memory (RAM)) components, a user interface 22 which can include, for example, a touchscreen or a display device along with an input device, a network interface 24 for transmitting and receiving data via wired and/or wireless communication links, and one or more sensors 26 which can include a positioning unit such as a Global Positioning Service (GPS) module, an accelerometer, a gyroscope, etc.

The memory 20 can store instructions, executable on the one or more CPUs 14, that implement an operating system 40 and various software applications such as a geographic application 42. The geographic application 42 can be a special-purpose software application dedicated to generating geographic content such as interactive digital maps, navigation directions, results of geographic queries, etc. According to other implementations, however, the geographic application 42 can be a general-purpose browser application executing a script and/or application programming interface (API) functions for generating geographic content. Further, the geographic application 42 can receive geographic content from an online geographic service. Thus, depending on the implementation, the automatic determination of the mode of transport for user-requested navigation directions can be carried out in the geographic application 42, one or more servers which the geographic application 42 accesses via a communication network, or partially in the geographic application 42 and partially in the one or more servers.

In some implementations, the memory 20 also stores instructions that implement an API 44 that indicates whether the user has access to a car. To this end, the API 44 can determine, for example, whether the user is within the geo-fence of a car rental facility or whether the user recently received an electronic confirmation regarding a car rental (in some embodiments, the user has to install certain applications and/or operate certain controls to allow the API 44 to make this determination). Software applications executing on the user device 12, including the geographic application 42, can invoke the API 44.

The user device 12 can communicate to various servers via a communication network 50, which can be the Internet or any other suitable network. The servers can include a map data server 60 configured to provide map data describing various natural geographic features (e.g., rivers, mountains, forests) as well as artificial geographic features (e.g., roads, buildings, parks), a navigation server 62 configured to provide step-by-step navigation directions, and an auto-suggest server 64 configured to provide automatic suggestions, including mode of transport. In general, the servers 60, 62, and 64 can work in any suitable configuration, such as part of a single server/group of servers or as multiple different servers, on the same network or on different networks, etc. In some implementations, the servers 60, 62, and 64 are maintained by a same operator that provides various geographic services. In other implementations, different providers of geographic services can provide different respective services, such as mapping and navigation, for example.

In operation, the autosuggest server 64 can receive an indication of the current location of the device 12 or of another starting point for navigation directions, an indication of the destination to which the user of the device 12 wishes to travel, and determine which mode of transport is likely to be most relevant to the user. More particularly, the autosuggest server 64 can determine the current geographic context of the device 12, as discussed in more detail below with reference to FIG. 5, using information received from the device 12 and/or data from one or several databases (not shown). The database(s) can store information about public transportation (routes, schedules, etc.), locations and geofences of car rental facilities, information regarding bicycling routes and walking paths, as well as user-specific data such as historical data indicative of the user's preferences regarding walking, driving, etc. or indications of recent transactions related to car rental. As indicated above, the user can operate certain controls and/or install certain software to allow the geographic application 42 and/or autosuggest server 64 to utilize user-specific information in this manner.

Example Scenarios

Figure 2:
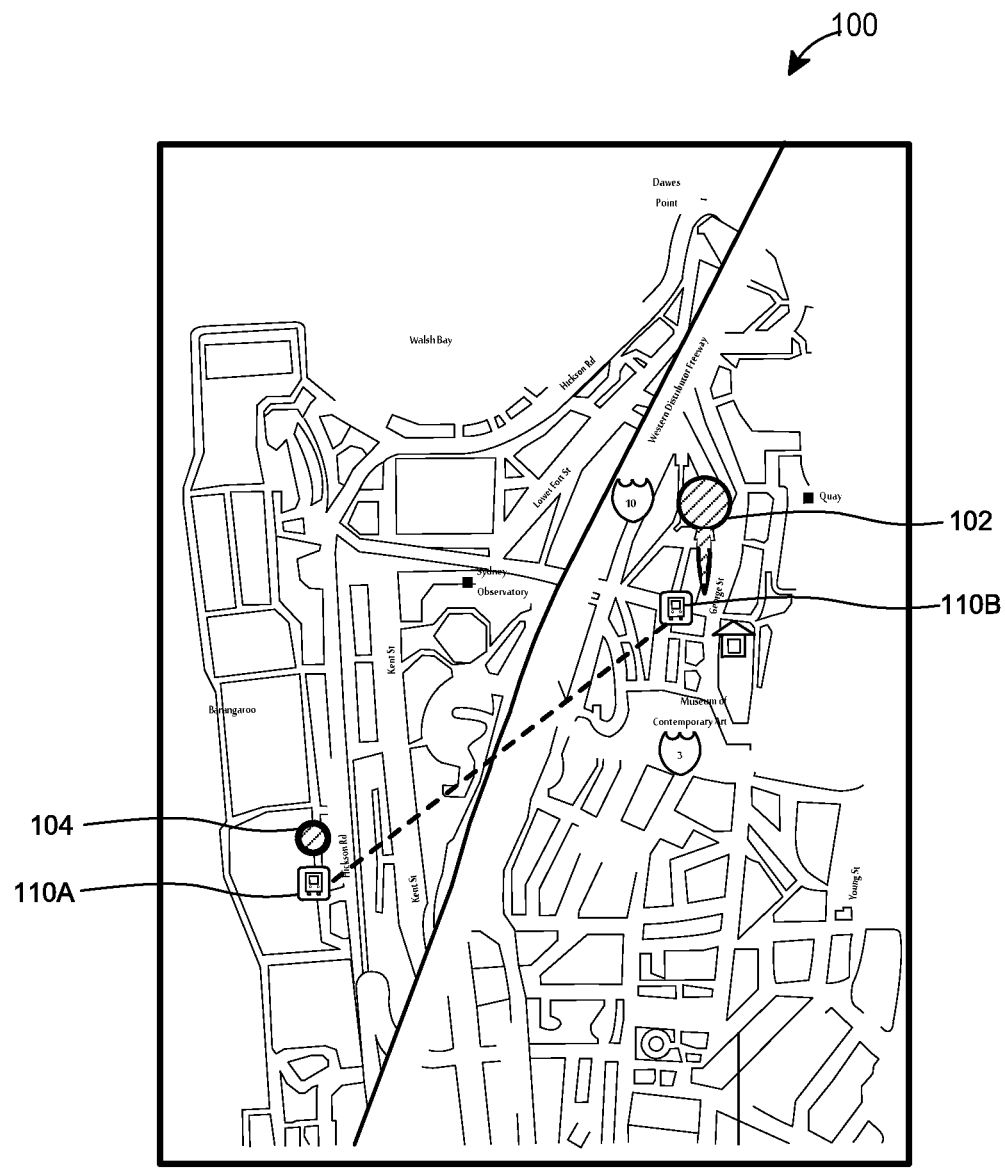
FIG. 2 schematically illustrates a scenario in which the geographic application of FIG. 1 suggests public transport based at least in part on proximity of the current location of the user device and the destination to public transport in an urban area.

Now referring to FIG. 2, the geographic application 42 in an example scenario can receive, via a user interface of the device 12, an indication that the user wishes to travel to the location represented on the map 100 by location marker 102. As more specific example, the user can activate the navigation mode of the geographic application 42 and speak the name of the destination (e.g., "movie theater at Main and Third"), or activate the menu for requesting navigation directions and type the address or the name of the destination. The user can similarly specify the starting point for the navigation directions, or the geographic application 42 can determine the current location of the device 12 using the sensors 26 and associate the starting point with the current location. The starting point is presented on the map 100 by current location indicator 104.

Without the user specifying the mode of transport, the geographic application 42 alone, or in cooperation with the autosuggest server 64, determines in this example scenario that both the location represented by the marker 102 and the location represented by the indicator 104 are near respective subway stations 110A and 110B. Accordingly, the geographic application 42 can select public transport as the suggested mode of transportation, and obtain public transport directions for travelling to the location represented by the marker 102 from the navigation server 62. The geographic application 42 and/or the autosuggest server 64 can also consider other factors, such as the distance between the starting point and the destination, the number of stops and transfers between the stations 110A and 110B, whether the starting point and the destination are in an urban area in which other types of transport may be available, whether public transport is available at the time when the navigation directions are requested (because certain types of public transportation may not be available at all hours in certain towns), whether the user previously expressed preference for certain mode of transport, etc. It will be further understood that different weights can be assigned to these factors. Thus, the geographic application 42 and/or the autosuggest server 64 can consider as signals, and appropriately weigh, any suitable number of factors to determine which mode of transport the user is most likely to choose.

Figure 3:
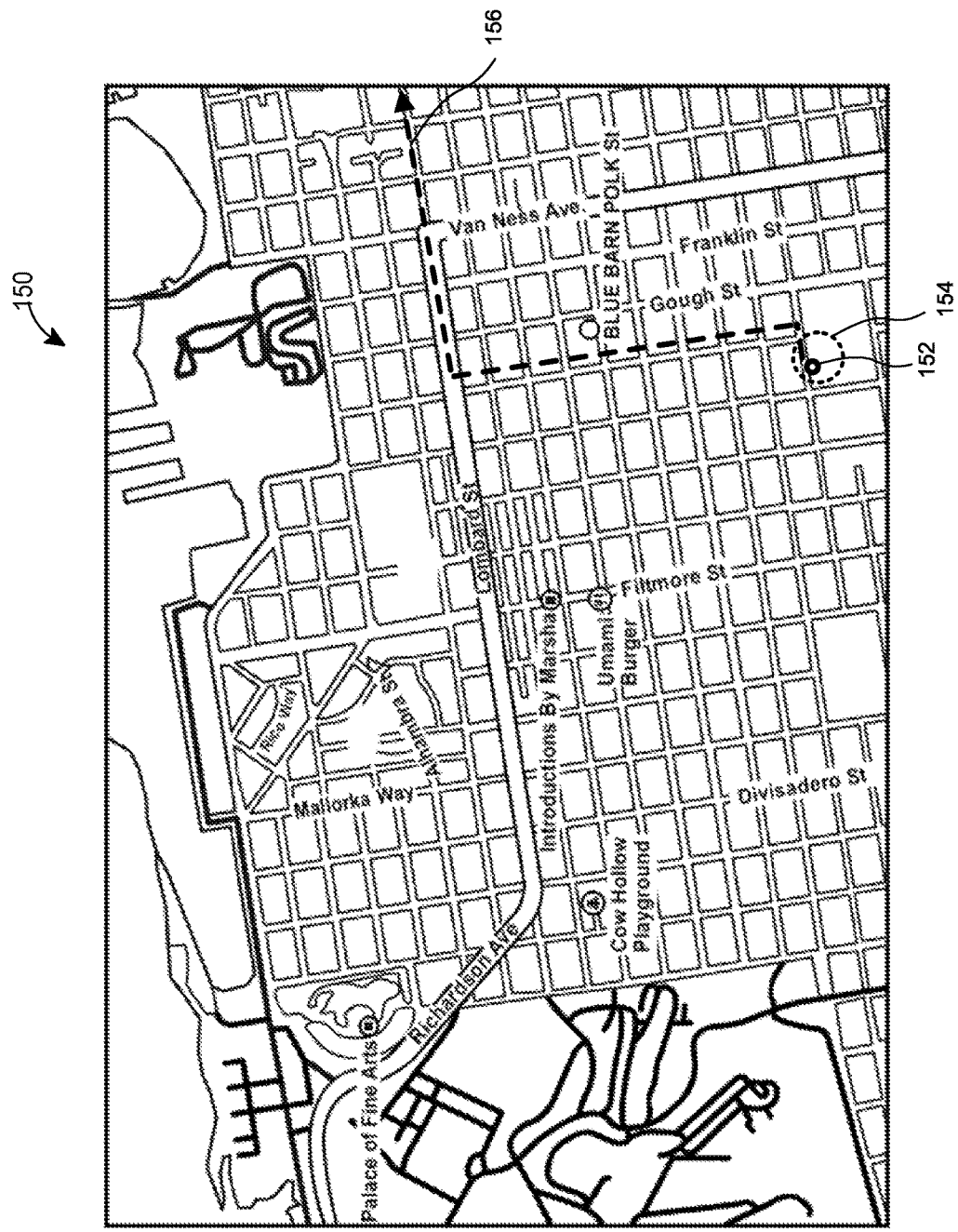
FIG. 3 schematically illustrates a scenario in which the geographic application of FIG. 1 suggests driving directions based at least in part on the user device being within the geo-fence of a car rental facility.

FIG. 3 illustrates another scenario in which the starting point for navigation directions is represented on a map 150 by a current location indicator 152. The starting point in this example is within a geo-fence 154 of a car rental facility. The destination in this example is relatively far (e.g., several miles) from the location of the indicator 152. The geographic application 42 and/or the autosuggest server 64 in this example can determine that the suggested mode of transport should be driving, and obtain driving directions from the navigation server 62. Partial driving directions are represented in FIG. 2 by arrows 156. Similar to the example of FIG. 2, the geographic application 42 and/or the autosuggest server 64 can consider additional factors, such as whether the user previously rented cars, when such information as available, for example.

Figure 4:
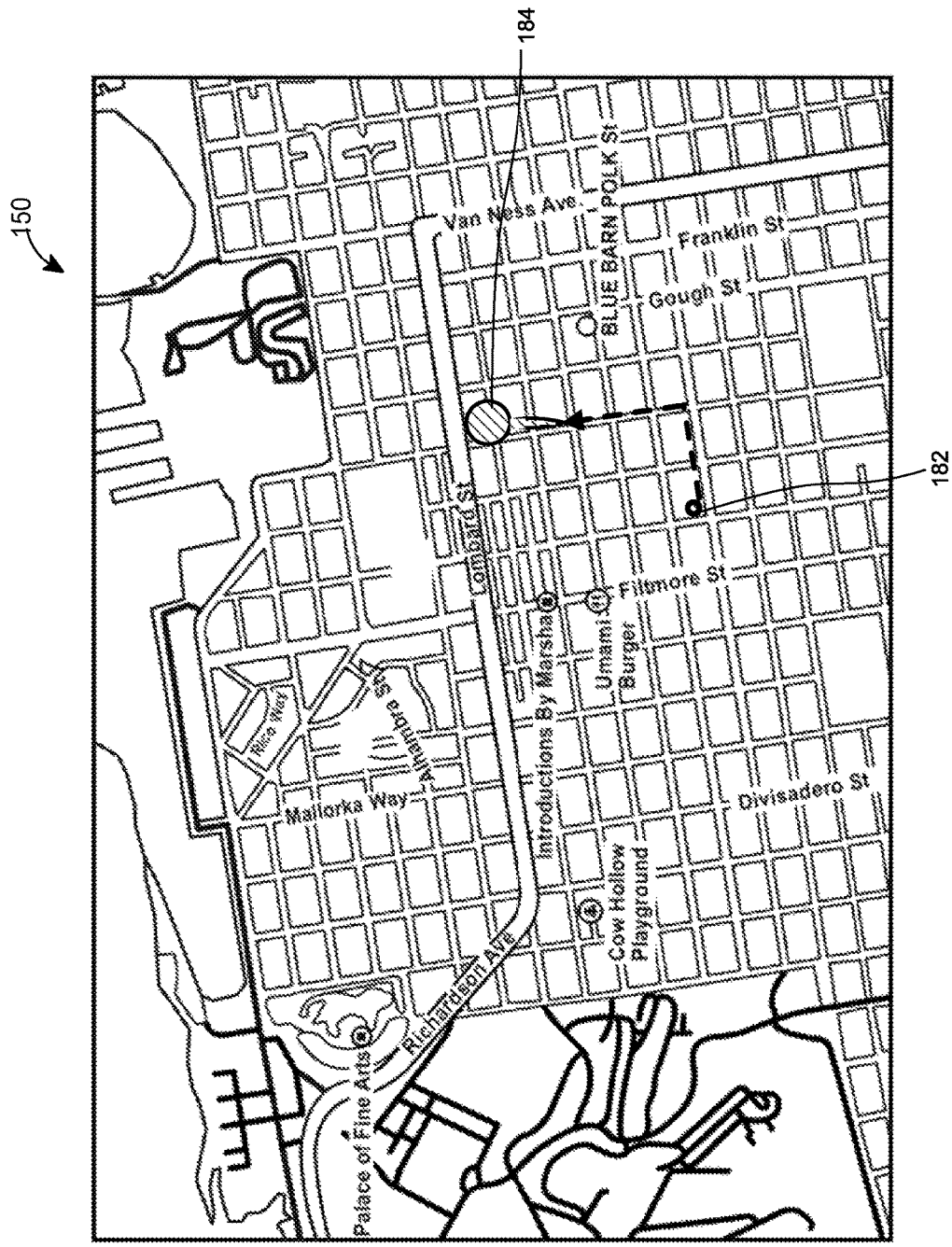
FIG. 4 schematically illustrates a scenario in which the geographic application of FIG. 1 suggests walking directions based at least in part on proximity of the current location of the user device to the destination.

In the scenario of FIG. 4, the starting point is represented by a current location marker 182, and the destination is represented by a location marker 184. The geographic application 42 and/or the autosuggest server 64 in this case determine that the these starting point and the destination are sufficiently proximate for walking, and accordingly obtain walking navigation directions from the navigation server 62. The geographic application 42 and/or the autosuggest server 64 can additionally consider such factors as, for example, availability of sidewalks, availability of bicycle trails and the likelihood the user can access to a bicycle, availability of public transport alternatives, etc.

Referring generally to FIGS. 2-4, the geographic application 42 and/or the autosuggest server 64 further can determine whether the movement of the user device 12 prior to determining the suggested mode of transport is consistent with driving, walking, bicycling, etc. Thus, for example, if the geographic application 42 receives a request to navigate to a certain destination and determines that the user is currently driving based on signals from the sensor(s) 26, or has been driving until recently (e.g., until fifteen minutes ago). The geographic application 42 accordingly may determine that the user likely wishes to drive to the destination even if other mode of transport are available. As a more specific example, for the same starting point and the same destination, the geographic application 42 in one case suggests public transport and in another case, when the user appears to have been driving, suggests driving.

Also, the geographic application 42 in the scenarios discussed above can receive an explicit selection of the mode of transport from the user. For example, upon receiving a selection of the destination, the geographic application 42 can automatically provide driving directions. The geographic application 42 then can receive a command via the user interface 22 to override the mode of transport to bicycling, and re-generate the directions according to the bicycling mode of transport.

Further, as discussed below with reference to FIG. 6, the geographic application 42 and/or the autosuggest server 64 can determine that the user switched her mode of transport prior to reaching the destination. For example, the user may have driven from the airport to the city center, parked the car, and started walking. In response to determining this change, the geographic application 42 can automatically obtain navigation directions for walking the rest of the way to the destination.

Example Methods for Generating Directions

Figure 5:
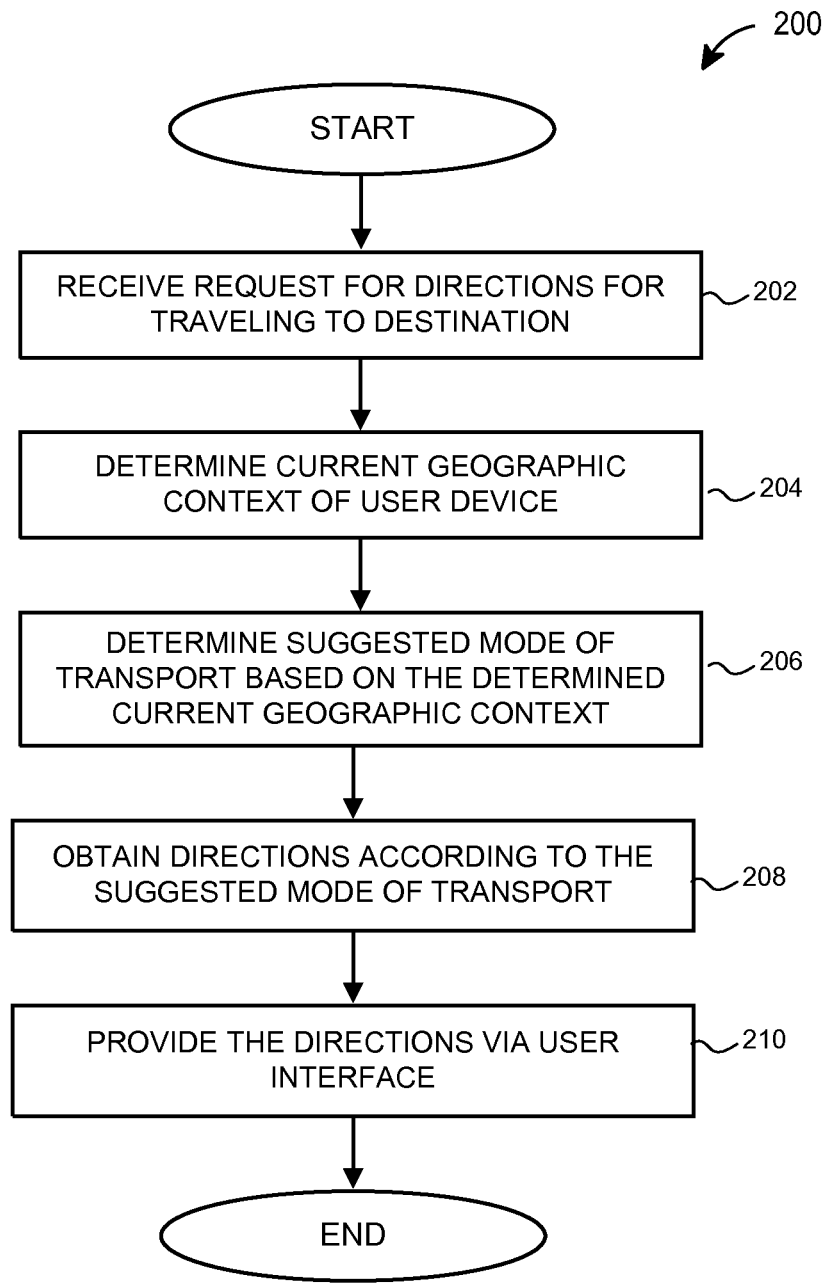
FIG. 5 is a flow diagram of an example method for providing directions according to an automatically determined mode of transport, which can be implemented in the system of FIG. 1.

Referring to FIG. 5, the method 200 can be implemented in the geographic application 42 of FIG. 1 as a set of instructions executable on the processor(s) 14, for example. The method 200 begins at block 202, where a request for directions for traveling to a destination is received at a user device. The request can be received via a touchscreen, a keyboard, a microphone, or any other suitable type of user interface of the user device. Depending on the scenario, the starting point for the requested directions is also received at block 202 or is automatically associated with the current location of the user device.

Next, at block 204, the current geographic context of the user is determined. As discussed above, the current geographic context can be based on one or more signals or factors such as the distance between the starting point and the destination, the mode of transport likely used during a certain period of time prior to the execution of block 204, proximity of the starting point and the destination to public transport, proximity of the starting point and the destination to bicycle paths, sidewalks, etc., current weather that may impact the user's willingness to walk or bike, availability of public transport in view of the current time of day, indications that the user may be renting a car in view of the geo-fence of a car rental facility and/or electronic messages related to car rental (e.g., an email confirmation that the user reserved a mid-size sedan), indications of user's general preferences, when available, etc. These factors can be weighed according to any other suitable scheme, such as for example assigning larger weights to user preferences, lower weights to the current mode of transport, and even lower weights to distances.

At block 206, the suggested mode of transport is determined based on the current geographic context determined at block 204. For example, the geographic application 42 and/or the autosuggest server 64 can determine that the user most likely wishes to walk to the destination in view of the current geographic context. The navigation directions according to the suggested mode of transport are generated at block 208. In one example scenario, the geographic application 42 receives the navigation directions from the navigation server 62 in response to submitting indications of the starting point, the destination, and the mode of transport determined at block 206. In another scenario, the geographic application 42 uses offline map data cached in the memory 20 to generate navigation directions.

The directions are provided to the user at block 210. It will be understood that the directions can be provided in a single instance as an overview and/or on a per-maneuver basis as the user travels toward the destination. Thus, some or all of the directions obtained at block 208 can be provided to the user, and the directions can be provided once or multiple times in different modes of presentation. Further, depending on user's preferences, the directions can be provided visually or audibly via the user interface 22, via the head unit of a vehicle, or in any other suitable manner. The method 200 completes after block 210.

Figure 6:
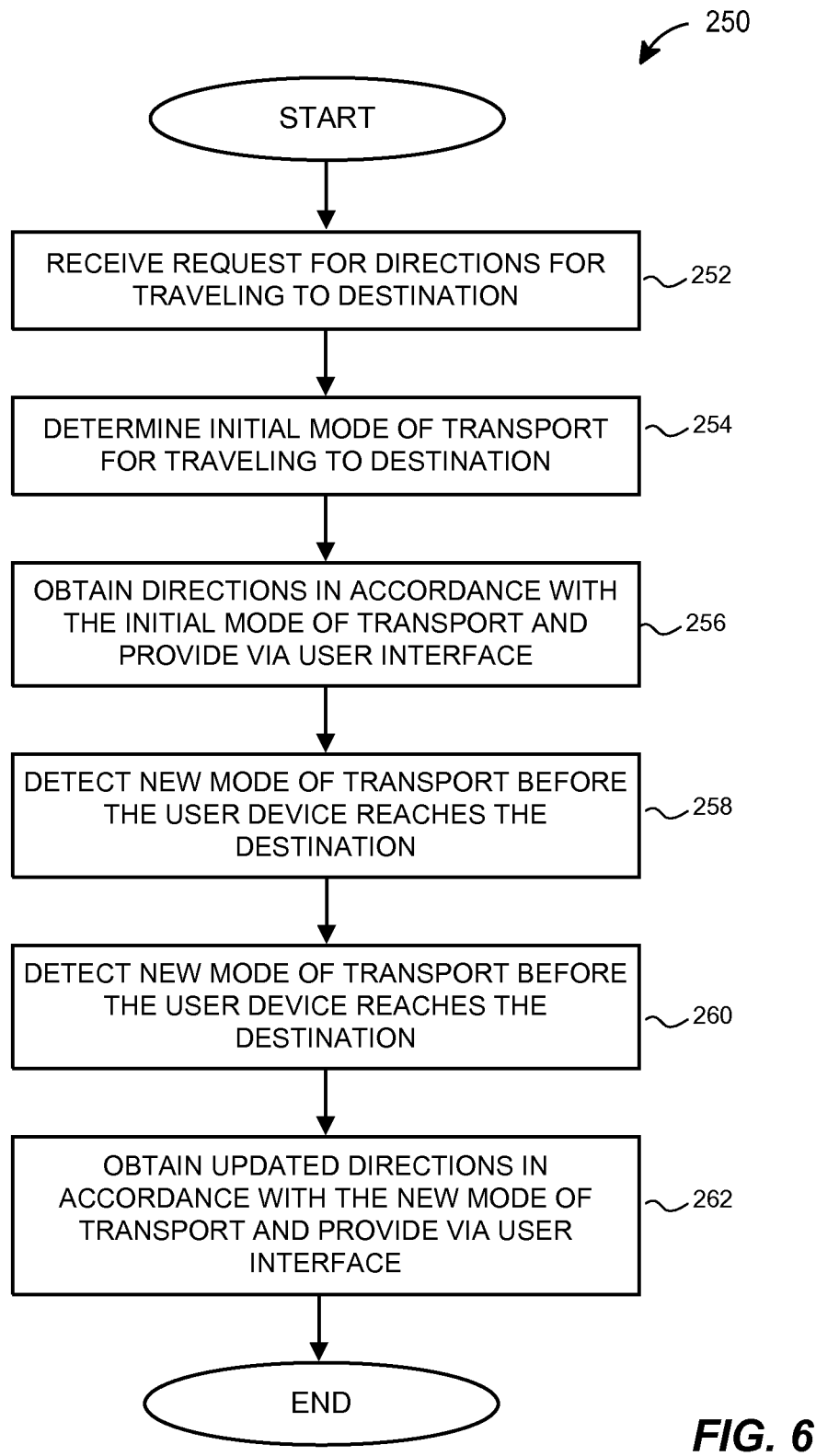
FIG. 6 is a flow diagram of an example method for providing directions according to an initial mode of transport and an automatically determined updated mode of transport, which also can be implemented in the system of FIG. 1.

FIG. 6 illustrates another example that also can be implemented in the geographic application 42 of FIG. 1 as a set of instructions executable on the processor(s) 14. Similar to the method 200, the method 250 begins at block 252, where a request for navigation instructions is received. At blocks 254 and 256, the initial mode of transport is determined and the corresponding navigation directions are received and provided via a user interface, similar to blocks 204-210 discussed above.

At block 258, the use of a new mode of transport is detected. For example, the user may arrive at an airport at a major city and request navigation directions to a hotel in the downtown area while waiting in line for her car at a car rental counter in the arrivals building. The geographic application 42 can determine that the user's current location is within the geo-fence of the car rental facility and suggest driving directions to the hotel, at blocks 252-254. The user does not override the suggested mode of transport. The user then begins driving, and the geographic application 42 provides the driving directions as the user makes progress along the route. However, before reaching the hotel, the user decides to park in a garage several blocks away from the hotel. The geographic application 42 determines at block 260 that the movement of the user device is no longer consistent with driving, and instead appears to be consistent with walking. In response, updated directions are generated at block 262 according to the new (walking) mode of transport and provided via the user interface.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

Upon reading this disclosure, those of ordinary skill in the art will appreciate still additional alternative structural and functional designs for providing directions via a user interface through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing directions in a geographic application, the method comprising:
   receiving, by one or more processors via a user interface of a user device, a request for directions for traveling to a destination, including not receiving a selection of a mode of transport;
   determining, by the one or more processors, a current geographic context of the user device using a positioning unit at the user device, wherein determining the current geographic context includes determining whether a current mode of transport of the user device within a specific period of time prior to the request is consistent with one of driving, walking, or bicycling;
   determining, by the one or more processors, a suggested mode of transport for travelling to the destination, based on the current geographic context, the suggested mode of transport being different from the current mode of transport;
   obtaining, by the one or more processors, directions for travelling to the destination using the suggested mode of transport; and
   providing, by the one or more processors, the directions via the user interface of the user device.

2. The method of claim 1, wherein determining the current geographic context of the device further includes determining whether the current location of the user device is within an urban area.

3. The method of claim 2, wherein determining the current geographic context of the device includes determining whether the destination is accessible from a current location of the user device via public transportation.

4. The method of claim 1, wherein determining the current geographic context of the device includes determining a distance between a current location of the user device and the destination.

5. The method of claim 1, wherein determining the current geographic context of the device includes determining whether a current location of the user device is within a virtual geographic fence of a car rental facility.

6. The method of claim 1, wherein the suggested mode of transport is one of:
   driving,
   walking,
   riding public transport, and
   bicycling.

7. The method of claim 1, wherein determining the current geographic context includes information received from one or more network servers.

8. The method of claim 1, wherein the current geographic context includes the weather, and wherein determining the suggested mode of transport includes determining whether the user likely wishes to walk to the destination in view of the current geographic context.

9. The method of claim 1, wherein determining the current geographic context includes determining availability of sidewalks.

10. The method of claim 1, wherein determining the current geographic context includes determining availability of bicycle trails.

11. The method of claim 1, wherein obtaining the directions is in response to determining that a user does not override the suggested mode of transport.

12. The method of claim 1, further comprising:
    subsequently to providing the directions via the user interface, determining a new mode of transport of the user device generating updated according to the new mode of transport.

13. A user device comprising:
    a user interface;
    one or more processors configured to execute the following:
       receiving, via the user interface, a request for directions for traveling to a destination, including not receiving a selection of a mode of transport,
       determining a current geographic context of the user device using a positioning unit at the user device, wherein determining the current geographic context includes determining whether current mode of transport of the user device within a specific period of time prior to the request is consistent with one of driving, walking, or bicycling,
       determining a suggested mode of transport for travelling to the destination, based on the current geographic context, the suggested mode of transport being different from the current mode of transport,
       obtaining directions for travelling to the destination using the suggested mode of transport, and
       providing the directions via the user interface.

14. The user device of claim 13, wherein determining the current geographic context of the device further includes determining whether the current location of the user device is within an urban area.

15. The user device of claim 13, wherein determining the current geographic context of the device includes determining a distance between a current location of the user device and the destination.

16. The user device of claim 13, wherein determining the current geographic context of the device includes determining whether a current location of the user device is within a virtual geographic fence of a car rental facility.

17. The user device of claim 13, wherein determining the current geographic context includes information received from one or more network servers.

18. The user device of claim 13, wherein the current geographic context includes the weather, and wherein determining the suggested mode of transport includes determining whether the user likely wishes to walk to the destination in view of the current geographic context.

19. The user device of claim 13, wherein determining the current geographic context includes determining availability of sidewalks.

* * * * *